United States Patent [19]

Machida et al.

[11] 4,368,482

[45] Jan. 11, 1983

[54] AUTOMATIC WHITE ADJUSTING CIRCUIT FOR A TELEVISION CAMERA

[75] Inventors: Toyotaka Machida, Kashiwa; Yuichi Ikemura, Nagareyama, both of Japan

[73] Assignee: Victor Company of Japan, Kanagawa, Japan

[21] Appl. No.: 183,392

[22] Filed: Sep. 2, 1980

[51] Int. Cl.$^3$ .......................................... H04N 9/535
[52] U.S. Cl. ..................................................... 358/29
[58] Field of Search ..................... 358/10, 29, 168, 169, 358/194.1, 198, 190, 209, 139; 455/185, 186, 343

[56] References Cited

U.S. PATENT DOCUMENTS

| | | | |
|---|---|---|---|
| 3,670,100 | 6/1972 | Briggs et al. | 358/29 |
| 4,114,103 | 9/1978 | Pflasterer | 455/186 |
| 4,215,368 | 7/1980 | Flory et al. | 358/139 |
| 4,219,197 | 2/1980 | van Spaandonk | 358/29 |
| 4,219,841 | 8/1980 | Nishimura et al. | 358/29 |
| 4,274,107 | 6/1981 | Tamura et al. | 358/29 |

Primary Examiner—John C. Martin
Attorney, Agent, or Firm—Posnack, Roberts, Cohen & Spiecens

[57] ABSTRACT

An automatic white adjusting circuit for a television camera having a color image pick-up tube comprises a first and second variable gain amplifiers for amplifying two predetermined primary color signals of the three primary color signals from an output signal of the image pick-up tube, a matrixing circuit for producing a luminance signal and two color difference signals, by being supplied with either said luminance signal from the output of the image pick-up tube or one remaining primary color signal of the three primary color signals, and outputs of the first and second variable gain amplifiers, an averaging circuit for producing a first and second white detection signals by substantially averaging all or a part of the respective video duration time of the output color difference signals from the matrixing circuit, reference level producing circuit in which a reference level equal to a DC current level of the two predetermined color difference signals of the output signal of the image pick-up tube upon image-picking up of a white object by the image pick-up tube is produce, first and second level comparators for respectively comparing the levels of the first and second white detection signals from the averaging circuit with the reference level from the reference level producing circuit, and first and second control voltage producing circuit for producing a first and second control voltages according to the outputs of the first and second level comparators. The first and second control voltages are supplied respectively to the first and second variable gain amplifiers, and controlling their respective gains so that the two color difference signals from the matrixing circuit upon image-picking up of the white object by the image pick-up tube become to substantially zero.

6 Claims, 3 Drawing Figures

FIG. 1

AUTOMATIC WHITE ADJUSTING CIRCUIT FOR A TELEVISION CAMERA

BACKGROUND OF THE INVENTION

The present invention relates generally to automatic white adjusting circuits for television cameras, and more particularly to an automatic white adjusting circuit for a television camera in which the adjustment of the white is performed automatically by the simple operation of aiming the television camera on a white surface.

Conventionally, in a high-grade television camera for business use, an automatic white adjusting circuit is provided to automatically adjust the white (correct the color temperature) so that the tint of an output signal of the color television camera does not change due to the color temperature of the illumination light source. This automatic white adjusting circuit is based on the theory that, upon picking-up an image of a white object, the three primary colors of red, green, and blue lights must be of the same level, and it adjusts the respective output signals of the three primary colors so that the three levels become the same.

There have been many kinds of conventional automatic white adjusting circuits in which an analog or a digital system is used. However, they all suffered disadvantages in that they all possessed a plurality of operating buttons which were troublesome to operate, and in the analog systems, the disadvantage was that the automatic white adjusting circuit as a whole became costly because of the high cost of the analog memories. Therefore, it was not possible to apply the automatic white adjusting circuit of this television camera for business use to the desired television camera for home use.

Furthermore, the television camera for business use is designed on the assumption that it will be operated by a professional operator, and requires the adjustment of the white every time the voltage source is applied to the television camera, thus also in this respect it is, not applicable to the television camera for home use.

A conventional portable color television camera is supplied with voltage from a voltage source of a portable video tape recorder. This type of portable video tape recorder shuts the voltage source off when the tape travel is put in the stop mode to reduce the power consumption. Accordingly, when the video tape recorder is put in the stop mode, the voltage source of the television camera also is shut off.

Therefore, in the automatic white adjusting circuit using digital memories, it suffers disadvantages in that the content of the digital memory is destroyed when the voltage source is shut off, requiring the adjustment of the white on every image-picking-up occasion, the operation being troublesome, and not being able to take pictures in the preferable timing.

To overcome these disadvantages, the television camera could possibly be provided with its own battery, so that the content of the digital memory can be kept in the same state even when the video tape recorder is in the stop mode. However, by providing the television camera with its own battery, both the weight and size increase, thus resulting in the disadvantages that the reduction of weight and size demanded for the portable television camera cannot be met.

On the other hand, when the automatic white adjusting circuit is constructed by using analog memories, the television camera does not require its own battery since the analog memory content does not change when the voltage source is put on or off. But the content of the analog memory is slowly destroyed with time by natural discharge, thus requiring a circuit to reduce this natural discharge, resulting in high cost, suffering the disadvantage that it is not suitable for television cameras for home use demanding low cost.

Therefore, an automatic white adjusting circuit which is especially effective when applied to a color television camera for home use, comprising a simple circuit construction and in which the white is automatically adjusted by a simple operation, was highly desired.

In the color television systems presently being used such as the NTSC, PAL, or SECAM systems, they are standardized to transmit a luminance signal and two color difference signals (I-and Q-signals in the NTSC system, and (R-Y) and (B-Y) signals in the PAL system). The white is obtained when the two color difference signals are zero, and the color television camera for home use comprises a circuit for generating the above color difference signals.

Upon picking-up of an image of an entirely white object by a television camera, the color difference signal is zero when the white adjustment matches with the color of the illumination light source, and the output of the above color difference signal generating circuit leans to the positive or negative side when the white adjustment does not match with the color of the illumination source. To adjust this leaning to the positive or negative side to zero, the primary color signal from the light element of any of the two primary colors of the three primary colors red (R), green (G), or blue (B) can be increased or decreased.

In the circuit for generating the color difference signals (R-Y) and (B-Y), for example, the amplification rate of the primary color signals or R and B can be gradually decreased when the generating output signal increases towards the positive side, and the amplification rate of the primary color signals of R and B (referred as R-signal and B-signal hereinafter) can be gradually increased when the generating output signal increases towards the negative side, respectively. The (R-Y) and R signals, and the (B-Y) and B signals, respectively, do not coincide completely with each other, but since the R signal contributes most to the (R-Y) signal and the B signal contributes most to the (B-Y) signal, the levels of the primary color signals R and B can be adjusted accordingly to adjust the two color difference signals (R-Y) and (B-Y), respectively, to zero.

However, upon actual operation, there is no problem when an entirely white surface exists under the illumination light source, but outdoors, in most cases, a white plate which is an object of an entirely white surface is not on hand. When a scenery having each color in a balanced manner is picked-up by a television camera in this case, positive or negative signals appear in the signal obtained from the color difference signal generating circuit in the television camera, the positive or negative signals having the color difference signal obtained upon picking-up of a white plate under that particular illumination light source as its center, and in the majority of occasions, the average value of the color difference signal at that time can be taken as the color difference signal obtained upon picking-up the image of a white plate under that illumination light source.

There are also times when the white surface is too small for the enlargement to the full scale of the image picking-up field of vision, and in this case, it is convenient to use the color difference signal relative to one portion of the picture, such as the central portion of the picture.

SUMMARY OF THE INVENTION

Accordingly, it is a general object of the present invention to provide a novel and useful automatic white adjusting circuit for a television camera in which the above described disadvantages have been removed.

More specifically, an object of the invention is to provide an automatic white adjusting circuit for a television camera in which average values are obtained by the use of a low-pass filter for the partial or entire duration of the picture of the two color difference signals to adjust the television camera so that it considers the color of the light source as white, and compares the average values with a reference level (zero color difference signal level) equal to the two color difference signal levels from the color difference signal generating circuit upon picking-up an image of an entirely white surface, to adjust the average value of the color difference signal to the above reference level by independently increasing or decreasing each of the two color difference signal levels. According to the present invention, the white detection can be simply performed. For the white adjustment, the output signal of the circuit which compares the above average value of the color difference signal with the reference level is used to generate the control voltage of the variable gain amplifier provided in each of the two primary color signal transfer systems, and the control voltage is fixed when the average value of the color difference signal becomes of the same level as the above reference level.

Another object of the invention is to provide an automatic white adjusting circuit for a television camera which uses two reversible counters as control voltage generating devices, converts the total output (parallel bits) of this reversible counter from digital to analog to obtain the above control voltage, increases or decreases the control voltage according to the addition counting or subtraction counting number of the reversible counter as a result of the comparison between the above color difference signal and the standard level, the above reversible counter alternately repeating a one-count addition and a one-count subtraction when the average value of the above two color difference signals approach the reference level, generates a control voltage which oscillates above and below the reference level, and fixes (maintains) the control voltage by stopping the totalling operation of the reversible counter. According to the present invention, the television camera can be constructed of low cost, as well as reduced size and weight.

Other objects and further features of the present invention wil be apparent from the description of the following preferred embodiments described in conjunction with the accompanying drawings.

DETAILED DESCRIPTION

Figure 1:
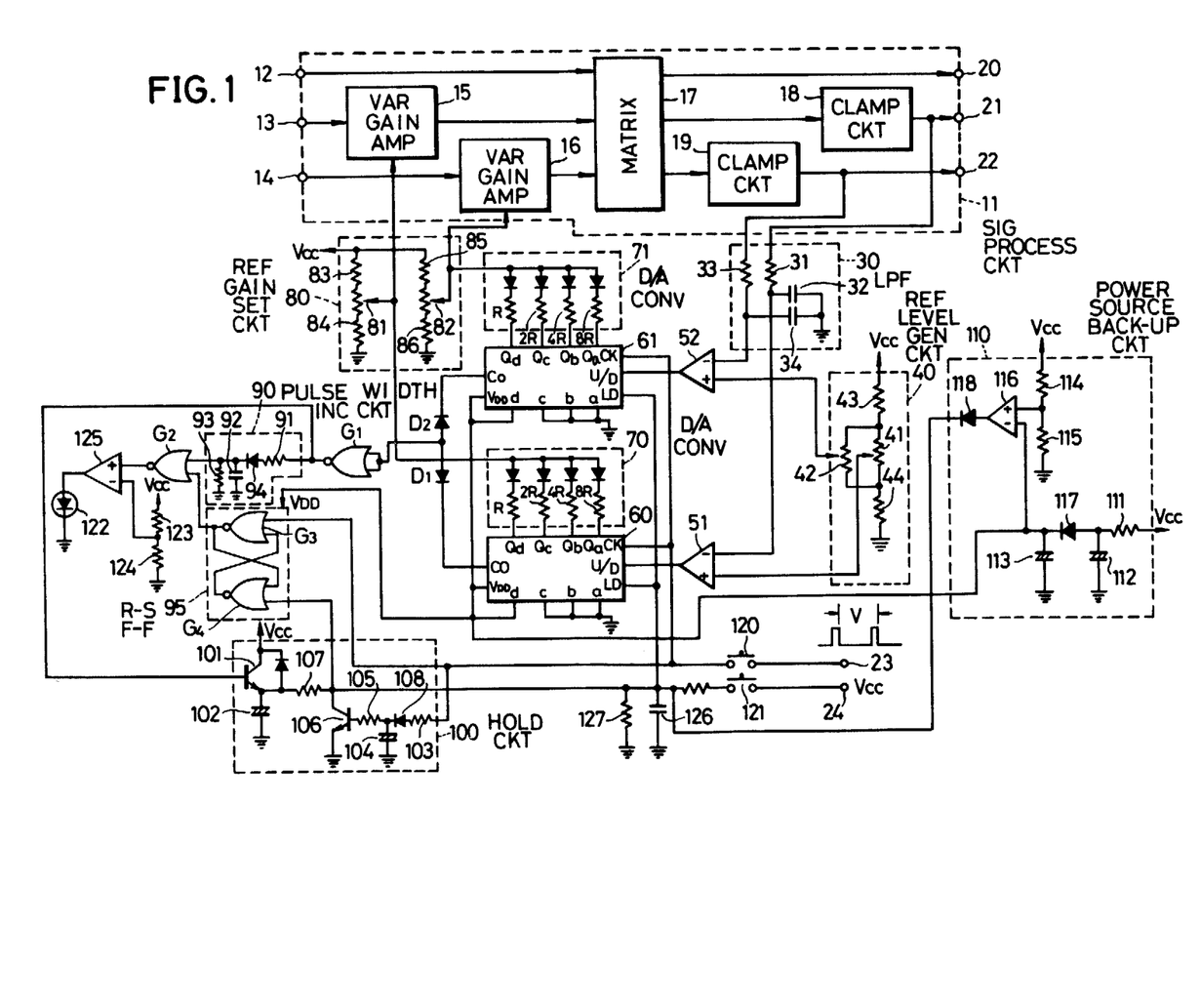
FIG. 1 is a circuit diagram showing a first embodiment of an automatic white adjusting circuit for a television camera according to the present invention.

A first embodiment of an automatic white adjusting circuit for a television camera according to the present invention will now be described with reference to FIG. 1. A signal processing circuit 11 in a color television camera has input terminals 12, 13 and 14. The input terminal 12 is supplied with a luminance signal from an output signal of an image pickup tube, and the input terminals 13 and 14 are respectively supplied with two of the three primary color signals, namely, red (R), green (G), and blue (B) signals. The input terminals 13 and 14 are respectively supplied with, for example, R and B signals. Alternatively, instead of the luminance signal, the input terminal 12 may be supplied with the remaining primary color signal (in this case, the G signal) other than the two primary color signals applied to the input terminals 13 and 14.

The R signal introduced through the input terminal 13 is supplied to a variable gain amplifier 15, the gain of which is varied responsive to a first control voltage described below. Similarly, the B signal applied to the input terminal 14 is fed to a variable gain amplifier 16 to control the gain thereof responsive to a second control voltage. The luminance signal introduced through the input terminal 12 and the R and B signals from the variable gain amplifiers 15 and 16 are fed together to a matrix circuit 17, where it undergoes a matrix operation to produce the luminance signal and color difference signals (R-Y) and (B-Y). From the output signals of this matrix circuit 17, the luminance signal is derived from an output terminal 20, and the color difference signal portions correspoding to the blanking periods from color difference signals (R-Y) and (B-Y) are held to a reference level by clamping circuits 18 and 19 and then sent out through output terminals 21 and 22 to a succeeding circuit stage within the color television camera.

On the other hand, the color difference signal (R-Y) from the clamping circuit 18 passes through a low-pass filter comprising a resistor 31 and a capacitor 32 and is then applied to an inversion input terminal of a comparator 51. The color difference signal (B-Y) from the clamping circuit 19 passes through a low-pass filter comprising a resistor 33 and a capacitor 34 and is then applied to an inversion input terminal of another comparator 52. These resistors 31 and 33, and capacitors 32 and 34 form a low-pass filter 30 for obtaining an average value of the above described color difference signals. To non-inverting input terminals of the comparators 51 and 52 are applied a reference voltage corresponding to the reference level from a reference level generation circuit 40 comprising variable resistors 41 and 42, and resistors 43 and 44. Accordingly, coupled with the high gain of the comparators 51 and 52, the output signal levels of the comparators 51 and 52 become low when the average value of the color difference signals (R-Y) and (B-Y) is higher than the reference level, and also become high when the aforementioned average value is lower than the reference level.

Output digital signals of the comparators 51 and 52 are respectively applied to up-down input terminals U/D of reversible counters 60 and 61 which form an essential part of the circuit of the present invention. These reversible counters 60 and 61 performs a subtraction counting operation when a low-level signal is applied to the up-down input terminal U/D thereof, that is, when the average value of each of the color difference signals (R-Y) and (B-Y) is higher than the reference level. Conversely, when a high-level signal is applied to the up-down input terminal U/D, that is, when the average value of each of the color difference signals (R-Y) and (B-Y) is less than the reference level, the reversible counters 60 and 61 perform an addition counting operation.

The reversible counters 60 and 61 count clock pulses applied to their clock pulse input terminals CK, whenever they perform an addition or subtraction counting operation. The circuit of the present invention is adapted to count a pulse which rises near the center of the picture screen obtained by forming a signal (for example, a vertical driving pulse) which is in synchronism with a vertical deflection pulse of the color television camera supplied from an input terminal 23 during an interval when an auto-setting switch 120 is closed.

The following is the reason why the pulse thus formed is used as a clock pulse. That is, the counted output signals of the reversible counters 60 and 61 are respectively supplied through digital to analog (referred to as "D/A" hereinafter) convertors 70 and 71 to a reference gain setting circuit 80. There, the signals are set to be first and second control voltages, which are respectively applied to the variable gain amplifiers 15 and 16 to variably change the gain thereof. Accordingly, a closed loop arrangement is established. Here, in order to obtain a correct average value of the color difference signals (R-Y) and (B-Y), the low-pass filter 30 is required to have a large time constant. However, if the low-pass filter 30 is designed to meet this requirement, the gain controlling operation takes too much time, which results in non-convergence of the closed loop operation. In this arrangement, the time constant of the low-pass filter 30 is required to be reasonably small. However, this results in an output containing some high-frequency components of the color difference signals (R-Y) and (B-Y) which were not filtered out.

The reversible counters 60 and 61 perform an addition or subtraction counting operation depending on the output of the comparators 51 and 52 at an instant of time when the clock pulse is applied thereto. This means that the reversible counters 60 and 61 sample the level of the color difference signals (R-Y) and (B-Y) when the clock pulse is applied thereto. If the frequency of the clock pulse is selected to be higher than the vertical scanning frequency, the color difference signals (R-Y) and (B-Y) are sampled at many positions within the picture screen. Accordingly, in the above described closed loop arrangement, it becomes difficult to pinpoint its converging point, and does operate correctly.

In contrast, if a pulse synchronized with the deflection operation of the television camera is used as the clock pulse, change in the video signal part occurs at the same point on the picture screen even if the color difference signal level undergoes change due to increase or decrease of one-count of the reversible counters 60 and 61. Accordingly, when the image of the same point of the same object is being continuously picked-up by the television camera in a fixed position during white adjusting period, the level change due to the closed loop operation and the signal change due to remaining high-frequency components of the color difference signal are clearly distinguished from each other, whereby the operation of the closed-loop arrangement converges rapidly. It will be understood that the signal synchronized with the vertical deflection of the television camera is sufficient as the clock pulse of the reversible counters 60 and 61, that is, as the sampling pulse.

Following is the reason why the signal synchronized with the vertical deflection of the television camera is subjected to waveshaping so as to have a rising edge near the center of the picture screen. In the image pick-up tube, a small change in the signal level can generally be seen at the peripheral part of the picture screen, which is referred to generally as "shading". Thus, even when a pure white surface image is being picked-up, somewhat colored parts appear around the peripheral part of the picture screen. In view of this, the position in the picture screen where the pulses are to be sampled is preferably located slightly on the lower side with respect to the center part of the picture screen, that is, around one third of the vertical length from the bottom of the picture screen. As a result of this selection of the position, the time constant (or cut-off frequency) of the low-pass filter 30 can be appropriately set, and the color difference signals (R-Y) and (B-Y) near the center of the picture screen are averaged in precise manner, and further minimum adverse effect due to shading takes place.

For the above reasons, in the present embodiment and second and third embodiments described later, the sampling pulses (that is, the clock pulses of the reversible counters 60 and 61) are synchronized with the vertical deflection of the television camera, and uses a pulse having a raised part around one third of the picture screen from the bottom thereof. Furthermore, it is preferable to have the position of the raised part of the sample pulse at about one-third of the picture screen from the bottom of the picture screen, as described above.

The outputs of the reversible counters 60 and 61 are counted values of the clock pulse selected as described above. The outputs are derived in parallel from output terminals Qa, Qb, Qc, and Qd, and are converted to a DC voltage depending upon the counted value by the D/A convertors 70 and 71 each of which comprises series connections of resistors and diodes. The least significant bit (LSB) output is derived from the terminal Qa, and the most significant bit (MSB) output from the terminal Qd. The output terminals Qa, Qb, Qc, and Qd of the reversible counters 60 and 61 are respectively connected to the resistors having resistance values 8R, 4R, 2R, and R within the D/A converters 70 and 71. For instance, in the case where the counted value of the reversible counter 60 is "8", all the output level of the terminals Qa, Qb, and Qc become low, while the output level of the terminal Qd becomes high, whereby the current from the reference gain setting circuit 80 connected to the television camera voltage source Vcc flows through the diodes to the resistors having the resistance values 8R, 4R and 2R in the D/A converter 70. When the counted value is "1", only the output level of the terminal Qa is high and the output level of the other terminals are low, whereby the current flows through the resistors having resistance values 4R, 2R, and R.

The output side of the D/A converter 70 is connected to a slider of a variable resistor 81 in the reference gain setting circuit 80. The output side of the D/A converter 71 is connected to a slider of a variable resistor 82. The variable resistor 81 is connected, through resistors 83 and 84 connected in series, between the voltage source Vcc of the television camera and the ground. Similarly, the variable resistor 82 is connected, through resistors 85 and 86 connected in series, between the voltage source Vcc and the ground. The reference gain setting circuit 80 comprises this resistor circuitry.

DC voltages derived through the sliders of the variable resistors 81 and 82, proportional to the counted values of the reversible counters 60 and 61, are respectively applied, as first and second control voltages, to the variable gain amplifiers 15 and 16 to change the gain thereof. The variable gain amplifiers 15 and 16 are adapted to increase their gains by increasing the control voltage.

Accordingly, the closed loop thus converges so that the gains of the variable gain amplifiers 15 and 16 are varied in response to the average value of the color difference signals (R-Y) and (B-Y), to change the reference level.

The reversible counters 60 and 61 alternately repeat the addition or subtraction counting operation. In this state, opening of the auto-setting switch 120 causes an interruption of the supply of the input clock pulse to the reversible counters 60 and 61. The reversible counters 60 and 61 thereby stop the counting operation to hold the first and second control voltages forcibly, thereby opening the closed loop. Accordingly, by controlling the level of the primary color signals R and B so as to minimize the difference between the average value of output of the color difference signals (R-Y) and (B-Y) and the reference level, white adjusting is performed. In addition, the reversible counters 60 and 61 are generally less expensive than the analog memories and may be of IC construction, whereby the white adjusting circuit of the present embodiment has advantageous features compared to that of the conventional construction such as low cost and miniaturized circuit organization.

In the above embodiment, the average value output of the color difference signals (R-Y) and (B-Y) has an error with respect to the reference value, the error generally being within ±1% of the counted value of the reversible counters 60 and 61. However, by setting the control voltage range appropriately, a white adjusting operation is performed without involving any difficulties in practical application.

In addition, the circuit of the present invention is adapted to alarm the operator, when the above described adjusting range exceeds the automatic white adjustable range. This alarming operation will now be described.

Since the reversible counters 60 and 61 are of 4-bit parallel output construction, the counted values range from "0" to "15" over sixteen steps, and the control voltage thereby changes over the sixteen steps. When the addition counting operation of the reversible counters 60 and 61 reaches the maximum value "15", the counters 60 and 61 send out a carry signal from the output terminal CO and thereafter change their counted values to "0", "1", "2", . . . , everytime a clock pulse is supplied thereto. Conversely, when the subtraction counting reaches the minimum count "0", a borrow signal is produced through the same output terminal CO, and thereafter the counted values are changed successively "15", "14", "13", . . . , responsive to each clock pulse supplied thereto.

When the object image is to be picked-up under a new illumination light source, the auto-setting switch 120 is first closed for white adjusting. Responsive to the closing of this switch 120, the vertical driving pulses, introduced through the input terminal 23, are applied respectively to the clock pulse input terminal CK of the reversible counters 60 and 61 simultaneously. Here, if the object exceeds the adjustable range, both or one of the reversible counters 60 and 61 continues the addition or subtraction counting operation indefinitely, thereby generating either carry or borrow signals "every" time the clock pulse is counted up to sixteen (16) from the output terminal CO thereof. Generation of the carry or borrow signal from the output terminal CO indicates that the closed loop is not converged. By flashing a lamp or generating a sound by this signal, it is possible to inform the operator of the unfit white adjusting condition to look for another white surface.

The carry or borrow signal (being of negative polarity pulse) provided through the output terminal CO of the reversible counters 60 and 61, is subjected to a logical summing operation by diodes $D_1$ and $D_2$, and is then inverted in its polarity by a NOR gate G and thereafter increases the high-level period thereof by a pulse width increasing circuit 90 which comprises a resistor 91, a diode 94, a capacitor 92, and a resistor 93. This pulse width increasing circuit 90 is provided to lengthen turn-off period of a light-emitting diode 122, which makes the flashing more visible for the operator. The output of the pulse width increasing circuit 90 is applied to one input terminal of a two-input NOR gate $G_2$, which thereby produces a low-level signal during the period when the above output is kept high. The output signal of the NOR gate $G_2$ is applied to a non-inverting input terminal of a comparator 125. The inverting input terminal of the comparator 125 is provided with a DC voltage divided by resistors 123 and 124. Accordingly, when a low-level output signal of the NOR gate $G_2$ is present, the comparator 125 produces as an output a low-level signal, thus causing the light-emitting diode 122 to be cut off.

When auto-setting switch 120 is closed, a set-reset flip-flop 95 (referred to as "RSFF" hereinafter) comprising a pair of NOR gates $G_3$ and $G_4$ is set to produce a low-level signal, which is applied to the NOR gate $G_2$. As a result, the output of the pulse width increasing circuit 90 is changed to a low-level, which changes the output of the NOR gate $G_2$ to a high-level, which, in turn, changes the output of the comparator 125 to a high-level, thus lighting the light-emitting diode 122.

Accordingly, the light-emitting diode 122 is turned off for a specific period of time responsive to every pulse from the output terminal CO of the reversible counters 60 and 61. In the present embodiment, the light-emitting diode 122 flashes at a rate once every period corresponding to 16 fields, that is, at about 3.7 Hz. If the adjustable range is exceeded for both red and blue, both the reversible counters 60 and 61 produce pulses from the output terminal CO thereof. Accordingly, the flashing period is shortened, depending on the phase relationship between both the pulses, thus indicating that it far exceeds the white adjustable range.

Next, the operation of a power source back-up circuit 110 according to the present invention will be described. Since the reversible counters 60 and 61 are adapted to memorize the control voltage for white adjustment, the memorized information is adversely erased when the power source is shut off. This means that white adjustment is required whenever the television camera is reconnected to the power source. Accordingly, particularly in the power cell operated portable television camera which is switched off for a longer period of time than it undergoes an image pickup operation, it suffers a disadvantage in that a proper image pick-up operation is not carried out from the instant the voltage source is turned on.

As a countermeasure to this, the reversible counters 60 and 61 are made of elements such as C-MOS wherein the current consumed becomes extremely small when no change occurs, and that the electric power thereto is constantly supplied after the voltage source is turned off.

In the power source back-up circuit 110, a DC voltage from the voltage source Vcc of the television camera main body is supplied through a delay circuit consisting of a resistor 111 and a capacitor 112, and a diode 117, to a capacitor 113 to be charged therein. The capacitor 113 is of large capacitance (10 μF to 33 μF, for instance) with small self-discharge characteristics, for example, a tantalum electrolytic capacitor. The DC voltage charged in the capacitor 113 is applied simultaneously to voltage source input terminals $V_{DD}$ of the reversible counters 60 and 61. Accordingly, the voltage of the voltage source can be continuously applied to the reversible counters 60 and 61 until the charged electric charge in the capacitor 113 is fully discharged, even if the voltage source Vcc is turned off.

The present applicant has made an experiment under a condition in which a 47 μF tantalum electrolytic capacitor was used for the capacitor 113, the reversible counters 60 and 61 being of C-MOS construction. In this experiment, it took eight to ten hours until the voltage charged in the electrolytic capacitor decreased to a minimum voltage (about 1.5 V in this case) required for the reversible counters 60 and 61 to hold the counted value, when Vcc is 9 V. For portable television cameras, the power source backing-up period of about eight to ten hours is sufficiently long.

Even if the above described power source backing-up measure is taken, when the television camera is left for a very long period, the electric charge charged in the capacitor 113 is fully discharged and the counted values in the reversible counters 60 and 61 are no longer held. When the image picking-up operation is carried out under this state where the counted values in the reversible counters 60 and 61 have been destroyed, the output signal of the television camera produces a picture in which the color differs to a large extent from the true color at the object.

Then, in order to eliminate this disadvantageous feature, the present embodiment is arranged in such a manner that a comparator 116 is provided within the power source back-up circuit 110, which receives at its inverting input terminal a voltage across the capacitor 113, and at its non-inverting input terminal a voltage which is the power source Vcc divided by the resistors 114 and 115. The latter voltage (2 V, for example) has some allowance (of about 0.5 V) with respect to the minimum voltage (1.5 V) for operating the reversible counters 60 and 61.

When the back-up voltage upon the reconnection of the voltage source is lower than that of the above DC voltage with the allowance factor, the positive DC voltage from a comparator circuit 116 is provided to a load terminals LD of the reversible counters 60 and 61 through a reverse current preventing diode 118. Predetermined values are loaded to preset input terminals a, b, c, and d of the reversible counters 60 and 61. This means that the preset input terminals a through c of the reversible counters 60 and 61 are grounded, and the terminal d is provided with the DC voltage from the capacitor 113, and a number "8" is established in binary code in the reversible counters 60 and 61. This preset value "8" is the counted value obtained upon the standard white adjustment made in a manufacturing factory when the closed loop converges and the color difference signals (R-Y) and (B-Y) are, respectively, substantially equal to the standard level. Therefore, upon the image pick-up of the object by reconnecting the voltage source after the power source back-up time is exceeded, the television camera produces an output signal according to the standard white adjustment made in the factory. Even if the illumination light source does not coincide with the white adjustment made in the factory, the difference is usually small, resulting in a fine picture with very little color shift. The reason the value "8" was selected is because it is a count value substantially in the middle of the count values "0" through "15", and substantially in the center of the white adjusting range.

The delaying circuit comprising the resistor 111 and the capacitor 112 is provided because the correct judgement on whether the back-up time has been exceeded or not cannot be made when the back-up capacitor 113 is charged by the voltage source $V_{cc}$ of the television camera to a voltage higher than that of the contact points of the resistors 114 and 115 before the real operation is performed by the connecting of the voltage source to the above comparator circuit 116, to delay the charging operation of the back-up capacitor 113.

Furthermore, the circuit of the present invention also provides a function to display the various operation states of the television camera to the operator, which will now be described. The television camera has the following three states. A first state is a preset state in which a preset value equal to the count value of the reversible counters 60 and 61 upon the above standard white adjustment made in the factory, is loaded in the reversible counters 60 and 61. This first state is displayed by the turning off of the light emitting diode 122. Therefore, the count values of the reversible counters 60 and 61 are the preset values or any random values upon the first connection of the voltage source or the reconnection of the voltage source after the back-up time has been exceeded. The capacitor 113 is not charged at this time or is of a lower voltage than the minimum operating voltage of the reversible counters 60 and 61, and thus a positive voltage is obtained from the comparator circuit 116. This positive voltage is provided to the load terminals LD of the reversible counters 60 and 61 through the diode 118 as described above, and loads the preset value, and provided to the reset terminal of the RSFF 95 to reset the RSFF 95 through a circuit comprising a capacitor 126 and a resistor 127. The output level of the NOR-gate G3 becomes high and the output level of the NOR-gate G2 low due to this resetting of the RSFF 95, and the light emitting diode 122 is turned off.

The second state is a state in which the white adjustment has been made (auto-setting state), and a most suitable value is set in the reversible counters 60 and 61. This state is displayed by the turning on of the light emitting diode 122. The auto-setting switch 120 is closed, an appropriate white part exists in the object, and by the closing of the auto-setting switch 120, the clock pulse from the input terminal 23 is provided to the clock pulse input terminal CK of the reversible counters 60 and 61, to perform the above stated automatic white adjustment operation by the closed loop. The clock pulse from the input terminal 23 is provided to the set terminal of the RSFF 95 to set the RSFF 95, and set the output level of the NOR-gate $G_3$ to low. On the other hand, an output pulse is not provided from the output terminal of the reversible counters 60 and 61, resulting in the high output level of the NOR-gate $G_2$, and the light emitting diode 122 continues to be turned on.

Upon the reconnection of the voltage source before the back-up time is exceeded in the auto-setting state, as stated above, the output level of the comparator circuit 116 becomes low, the reset signal is not provided to the RSFF 95, and the RSFF 95 maintains the previous auto-setting state and the light emitting diode 122 is turned on. The RSFF 95 uses an element of low current consumption like the C-MOS used for the reversible counters 60 and 61. The set state of the RSFF 95 is maintained since the voltage is designed to be provided by the back-up capacitor 113. Furthermore, if the voltage source is cut off when the output level of the NOR-gate $G_2$ is high without the comparator circuit 125 being used, the output is discharged through the light emitting diode 122, but this discharging of the output is prevented by providing the comparator circuit 125. A PNP transistor can be used in place of the comparator circuit 125.

The third state is a state in which the automatic white adjusting cannot be performed by the closing of the auto-setting switch 120, because there is no suitable white reflecting part in the object and is in a range beyond the automatic adjusting range. This state is displayed by the flashing of the light emitting diode 122. Here, the counting operation is performed in the reversible counters 60 and 61, but a negative carry or borrow signal output is produced from the terminal CO once every sixteen fields, and the light emitting diode 122 flashes as stated above. On the other hand, the positive signal from the NOR-gate $G_1$ is supplied to the base of an NPN transistor 101 in the holding circuit 100, and tries to charge a capacitor 102 connected between the emitter and ground. However, when the auto-setting switch 120 is closed, a capacitor 104 is charged by the above clock pulse provided through a resistor 103 and a diode 108. The charged voltage is supplied to the base of the NPN transistor 106 through the resistor 105 to turn the transistor on, thus the output level of the NOR gate $G_3$ remains low with the capacitor 102 not being charged and a reset signal not provided to the RSFF 95, resulting in the flashing of the light emitting diode 122.

If the auto-setting switch 120 is opened in this state, the transistor 106 becomes off, and the charging of the capacitor 102 is started by the collector current of the transistor 101. The charged voltage of the capacitor 102 is supplied to the reset terminal of the RSFF 95 through a resistor 107, and loads a predetermined preset value by supplying the voltage to the load terminals LD of the reversible counters 60 and 61.

By aiming the television camera to a correct white surface from the above state with the auto-setting switch 120 closed, the control voltage of the closed loop white adjustment circuit converges in a range, and the light emitting diode 122 turns on because it is in the second state mentioned above. A most suitable control voltage and the like can be obtained afterwards by the opening of the auto-setting switch 120.

By the closing of a reset switch 121, a DC voltage from the input terminal 24 of the voltage source $V_{cc}$ is applied to the reset terminal of the RSFF95 and the load terminal LD of the reversible counters 60 and 61, and since it is now in the first state, the diode 122 is turned off.

D/A converters 70 and 71 comprises resistors and diodes connected in parallel. The output level of the counting output terminals $Q_a$, $Q_b$, $Q_c$, and $Q_d$ of the reversible counters 60 and 61 are either in a low or a high stage, thus when known ladder type converters are used for the D/A converters, a current flows from the high level output terminal to the low level terminal during the back-up caused by the back-up circuit 110, and the charges charged in the back-up capacitor 113 are immediately discharged. Therefore, in the first and the third embodiments of the present invention, the converters 70 and 71 respectively comprises diodes arranged in one direction and weighting resistors connected in series, as shown in FIG. 1, and independent of the counting stage of the reversible counters 60 and 61, the current consumption during the back-up state is kept at a minimum value (the current consumption is theoretically zero).

Figure 2:
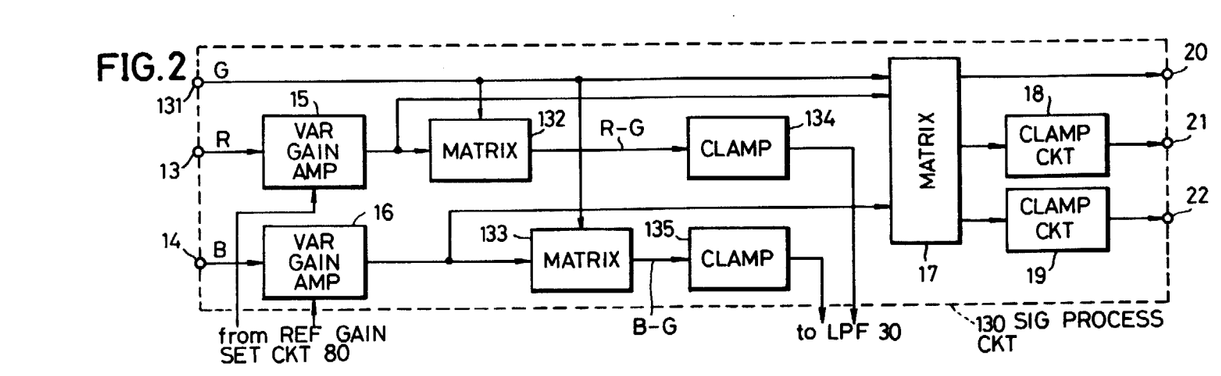
FIG. 2 and FIG. 3 are circuit diagrams respectively showing the essential parts of second and third embodiments of an automatic white adjusting circuit for a television camera according to the present invention.

The essential parts of a second embodiment will now be described in conjunction with FIG. 2. In FIG. 2, those parts which are the same as corresponding parts in FIG. 1 are designated by like reference numerals. Description of such parts will not be repeated. The green (G) signal of the image pick-up tube output signal of the television camera is provided to an input terminal 131 of a signal processing circuit 130. This input green signal is supplied to matrix circuits 132 and 133 as well as the matrix circuit 17, respectively. This matrix circuit 132 performs a matrix operation on the green signal and the red (R) signal from the variable gain amplifier 15, respectively, and provides an output to the low-pass filter 30 through a clamping circuit 134. On the other hand, the matrix circuit 133 performs a matrix operation on the green signal and the blue (B) signal from the variable gain amplifier 16, respectively, and provides an output to a low-pass filter 30 through a clamping circuit 135.

The present embodiment of the present invention compares the level of the color difference signals (R-G) and (B-G) with the standard level. The gain of the red and green signals are controlled respectively at the variable gain amplifiers 15 and 16 so as to make the three primary color signals have the ratios 1:1:1 to eleminate the difference between levels of two color difference signals. The control voltage is fixed at this time.

Accordingly, this second embodiment differs from the first embodiment only in that the white detection signal is a signal obtained by comparing the color difference signals (R-G) and (B-G) with the standard level. The white adjustments can also be made in this embodiment by the negative feed back closed loop configuration performing the gain control of the variable gain amplifiers 15 and 16 according to the control voltage obtained by operating the reversible counters 60 and 61.

Figure 3:
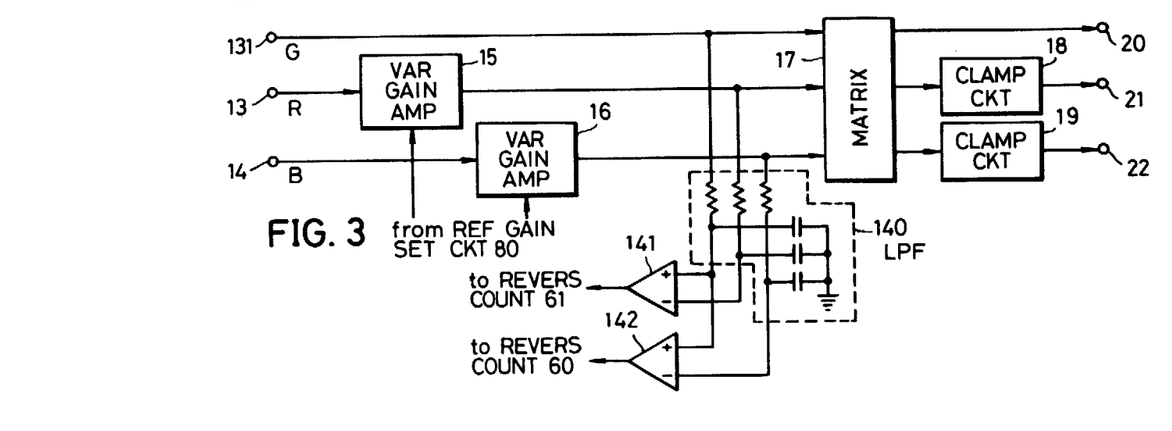

The essential parts of the circuit of a third embodiment of the present invention will now be described in conjunction with FIG. 3. In FIG. 3, those parts which are the same as corresponding parts in FIG. 1 are designated by like reference numerals. Description of such parts will not be repeated. The green signal from an input terminal 131 is supplied to each of non-inversion input terminals of comparator circuits 141 and 142 after the value has been averaged by a low-pass filter 140. On the other hand, the value of the red signal from the variable gain amplifier 15 is averaged by a low-pass filter 140 and supplied to an inversion input terminal of the comparator circuit 141, and the value of the blue signal from the variable gain amplifier 16 is averaged by the low-pass filter 140 and supplied to an inversion input signal of the comparator circuit 142.

In this third embodiment, the average value output of the green signal is assumed as the standard level. This is because of the fact that the green signal generally has the smallest changing rate relative to the color temperature of the illumination light source, of the three primary color signals. According to this embodiment, the red and blue signals are controlled so as to be equal to the green signal by the control voltage generated by the output white detection signal of the comparator circuits 141 and 142, and the white adjustment is performed when these three signals are all equal by fixing the control voltage.

In the above embodiment, the light emitting diode 122 was used as a display element, but any other display device such as a lamp may be used. Furthermore, a buzzer or the like may be used for the alarm. The reversible counters 60 and 61 are not limited to IC devices, and the reversible counters of the present invention also include microprosessors which similarly perform counting operations by program control.

Further, this invention is not limited to these embodiments but various variations and modifications may be made without departing from the scope of the invention.

What we claim is:

1. An automatic white adjusting circuit for a television camera having a color image pick-up device, said automatic white adjusting circuit comprising;
    first and second variable gain amplifying means for amplifying two predetermined primary color signals of the three primary color signals from an output signal of said image pick-up device;
    matrixing means for producing two color difference signals by being supplied with either a luminance signal from the output of said image pick-up device or one remaining primary color signal of the three primary color signals, and outputs of said first and second variable gain amplifying means;
    averaging means for producing first and second white detection signals by substantially averaging all or part of the respective video duration time of said output color difference signals from said matrixing means;
    reference level producing means in which a reference level equal to a DC level of said two predetermined color difference signals of said output signal of the image pick-up device upon image-picking up of a white object by said image pick-up device is produced;
    first and second level comparing means for respectively comparing the levels of said first and second white detection signals from said averaging means with said reference level from said reference level producing means;
    first and second control voltage producing means for producing first and second control voltages according to the outputs of said first and second level comparing means,
    said first and second control voltages being supplied respectively to said first and second variable gain amplifying means, and controlling their respective gains so that said two color difference signals from said matrixing means upon image-picking up of the white object by said image pick-up device become substantially zero;
    a clock pulse supplying means;
    said first and second control voltage producing means comprising, respectively, first and second reversible counters for producing said first and second control voltages according to the counted value obtained by counting said clock pulse supplied thereto and by being supplied with said first and second white detection signals as counting operation control signals;
    means for preventing the supply of said clock pulse to said first and second reversible counters, stopping the counting operation of said first and second reversible counters, and holding the counted value, said first and second control voltages being held constant at values upon the stoppage of the counting operation of said first and second reversible counters;
    said first and second control voltage producing means further comprising series connected circuits having weighting resistors and diodes, said series connected circuits being connected in series between digital count output termnals of said first and second reversible counters and a voltage source, said first and second control voltages being supplied to said first and second variable gain amplifying means through said series connected circuits; a power source back-up circuit including a capacitor connected to said voltage source for operating said first and second reversible counters and charged by said voltage source, said capacitor applying an operating voltage to said first and second reversible counters for a certain time period after cut-off of said voltage source.

2. An automatic white adjusting circuit for a television camera having a color image pick-up device, said automatic white adjusting circuit comprising:
    first and second variable gain amplifying means for amplifying two predetermined primary color signals of the three primary color signals from an output signal of said image pick-up device;
    matrixing means for producing two color difference signals, be being supplied with either a luminance signal from the output of said image pick-up device or one remaining primary color signal of the three primary color signals, and outputs of said first and second variable gain amplifying means;
    averaging means for producing first and second white detection signals by substantially averaging all or a part of the respective video duration time of said output color difference signals from said matrixing means;
    reference level producing means in which a reference level equal to a DC level of said two predetermined color difference signals of said output signal of the image pick-up device upon image-picking up of a white object by said image pick-up device is produced;
    first and second level comparing means for respectively comparing the levels of said first and second white detection signals from said averaging means with said reference level from said reference level producing means;
    first and second control voltage producing means for producing first and second control voltages according to the outputs of said first and second level comparing means, said first and second control voltages being supplied respectively to said first and second variable gain amplifying means, and controlling their respective gains so that said two color difference signals from said matrixing means upon image-picking up of the white object by said image pick-up device become substantially zero;

a clock pulse supplying means;

said first and second control voltage producing means comprising, respectively, first and second reversible counters for producing said first and second control voltages according to the counted value obtained by counting said clock pulse supplied thereto and by being supplied with said first and second white detection signals as counting operation control signals; and means for emitting an alarm by carry or borrow signals supplied from said first and second reversible counters when said two color difference signals from said matrixing means are not substantially zero, to inform by said alarm that white adjustment has not been made.

3. An automatic white adjusting circuit for a television camera having a color image pick-up device, said automatic white adjusting circuit comprising;

first and second variable gain amplifying means for amplifying two predetermined primary color signals of the three primary color signals from an output signal of said image pick-up device;

matrixing means for producing two color difference signals, by being supplied with either a luminance signal from the output of said image pick-up device or one remaining primary color signal of the three primary color signals, and outputs of said first and second variable gain amplifying means;

averaging means for producing first and second white detection signals by subetantially averaging all or a part of the respective video duration time of said output color difference signals from said matrixing means;

reference level producing means in which a reference level equal to a DC level of said two predetermined color difference signals of said output signal of the image pick-up device is produced;

first and second level comparing means for respectively comparing the levels of said first and second white detection signals from said averaging means with said reference level from said reference level producing means;

first and second control voltage producing means for producing first and second control voltages according to the outputs of said first and second level comparing means, said first and second control voltages being supplied respectively to said first and second variable gain amplifying means, and controlling their respective gains so that said two color difference signals from said matrixing means upon image-picking up of the white object by said image pick-up device become substantially zero;

a clock pulse supplying means;

said first and second control voltage producing means comprising, respectively, first and second reversible counters for producing said first and second voltages according to the counted value obtained by counting said clock pulse supplied thereto and by being supplied with said first and second white detection signals as counting operation control signals;

a flip-flop which is reset by a loading signal when a preestablished counted value is loaded in said first and second reversible counters, and set by the counting pulse of said first and second reversible counters when the counted value of said first and second reversible counters is at a suitable value according to the automatic white adjustment;

means for cutting-off the supply of said counting pulse to said flip-flop when the counted values of said first and second reversible counters do not stabilize to a specific value;

a single display means; and driving means for driving said display means by a logical-sum output of either carry or borrow signals from said first and second reversible counters and said flip-flop output signal.

4. An automatic white adjusting circuit for a television camera having a color image pick-up device, said automatic white adjusting circuit comprising;

first and second variable gain amplifying means for amplifying two predetermined primary color signals of the three primary color signals from an output signal of said image pick-up device; matrixing means for producing a luminance signal and two color difference signals, by being supplied with one remaining primary color signal of the three primary color signals, and outputs of said first and second variable gain amplifying means; averaging means for substantially averaging all or a part of the respective video duration time of the output color signals from said first and second variable gain amplifying means and the remaining primary color signal;

first and second level comparing means for respectively comparing the levels of the averaged output signals of the first and second variable gain amplifying means with the averaged remaining primary color signal;

first and second control voltage producing means for producing first and second control voltages according to the outputs of said first and second level comparing means, said first and second control voltages being supplied respectively to said first and second variable gain amplifying means, and controlling their respective gains so that said remaining primary color signals and said two output primary color signals from said first and second variable gain amplifying means upon image-picking up of the white object by said image pick-up device become substantially equal to each other;

a clock pulse supplying means, said first and second control voltage producing means further comprising, respectively, first and second reversible counters for producing said first and second control voltages according to the counted value obtained by counting said clock pulse supplied thereto and by being supplied with said outputs of said first and second level comparing means as counting operation control signals, series connected circuits having weighting resistors and diodes, said series connected circuits being connected in series between digital count output terminals of said first and second reversible counters and a voltage source, said first and second control voltages being supplied to said first and second variable gain amplifying means through said series connected circuits; and a power source back-up circuit including a capacitor connected to a terminal of said voltage source for operating said first and second reversible counters and charged by said voltage source, said capacitor applying an operating voltage to said first and second reversible counters for a certain time period after cut-off of said voltage source.

5. An automatic white adjusting circuit as claimed in claim 1 or 4 in which said power source back-up circuit further comprises means for detecting whether the voltage applied to said voltage source terminal for operating said first and second reversible counters from said capacitor is lower than the predetermined voltage associated to the minimum operating voltage of said first and second reversible counters, and means for setting a certain counted value in said first and second reversible counters upon a different white adjustment only when the voltage detected by said detection means is smaller than said predetermined voltage.

6. An automatic white adjusting circuit as claimed in claim 1 which further comprises a flip-flop which is reset by a loading signal when a preestablished counted value is loaded in said first and second reversible counters, and set by the counting pulse of said first and second reversible counters when the counted value of said first and second reversible counters is a most suitable value according to the automatic white adjustment, means for cutting-off the supply of said counting pulse to said flip-flop when the counted values of said first and second reversible counters do not stabilize to a specific value, a single display means, and driving means for driving said display means by a logical-sum output of either carry or borrow signals of said first and second reversible counters and said flip-flop output signal.

* * * * *